United States Patent [19]

Dazai et al.

[11] Patent Number: 4,738,300

[45] Date of Patent: Apr. 19, 1988

[54] ENDLESS TRACK TYPE CONTINUOUS CASTING INSTALLATION

[75] Inventors: Hiroshi Dazai, Yokohama; Yutaka Tsuchida, Yokosuka; Shuzo Takahashi; Nobuhisa Hasebe, both of Yokohama; Katsuyuki Sako, Fujisawa, all of Japan

[73] Assignees: Ishikawajima-Harima Jukogyo Kabushiki Kaisha; Nippon Kokan Kabushiki Kaisha, both of Japan

[21] Appl. No.: 38,989

[22] Filed: Apr. 16, 1987

[51] Int. Cl.⁴ ............................................. B22D 11/06
[52] U.S. Cl. ..................................... 164/430; 164/479
[58] Field of Search ....................... 164/430, 431, 479

[56] References Cited

U.S. PATENT DOCUMENTS

| | | | |
|---|---|---|---|
| 1,139,889 | 5/1915 | Mellen | 164/430 |
| 3,342,251 | 9/1967 | Nagin et al. | 164/430 |
| 4,331,195 | 5/1982 | Webber | 164/430 X |

FOREIGN PATENT DOCUMENTS 60-37248  2/1985  Japan .................. 164/430

Primary Examiner—Nicholas P. Godici
Assistant Examiner—J. Reed Batten, Jr.

[57] ABSTRACT

In an endless track type continuous casting installation of the type in which a mold cavity having variable thickness for a casting is defined by the combination of block molds each of which is of an L-shaped cross section and which are connected with each other in the form of a loop, thereby providing each of a pair of endless tracks, safety is ensured with the block molds of the pair of endless tracks are combined to define a mold cavity.

5 Claims, 4 Drawing Sheets

Fig. 8 (ii)

Fig. 8 (iii)

ENDLESS TRACK TYPE CONTINUOUS CASTING INSTALLATION

BACKGROUND OF THE INVENTION

The present invention relates to an endless track type continuous casting installation and more particularly a block type continuous casting installation.

A typical example of the conventional endless track type continuous casting installations is shown in FIGS. 1 and 2.

In such continuous casting installation, a plurality of block molds 1 of L-shaped cross section and having two portions 1a and 1b are interconnected in the form of a loop such that the bottom portion 1a is disposed along the peripheral surface while the side portion 1b is disposed outwardly and perpendicular to the peripheral surface, thereby forming an endless track 2. A pair of upper and lower endless tracks 2 thus constructed are disposed in opposing relationship with each other and partially and peripherally in contact with each other. In such a zone of contact, the block molds to be paired become point-symmetric as shown in FIG. 2 and that the block molds 1 to be paired are combined such that the end surface P of the bottom portion 1a of each block mold 1 is made into engagement and intimate contact with the inner surface of the side portion 1b of the mated block mold 1, whereby a mold cavity 3 with variable space thickness is defined. The upper and lower endless tracks 2 are driven in the directions indicated by the arrows a and b, respectively, so that the block mold pairs 1 are moved in the same direction at the zone of contact of the upper and lower endless tracks 2. Molten metal 4 is poured into the mold cavity 3 from one open end thereof while a casting 5 is withdrawn from the other open end thereof.

With the continuous casting installation having the above-described construction, the mold cavity 3 is defined by the following steps. First, the block mold 1 of the upper endless track 2 is lowered while the block mold 1 of the lower endless track 2 is raised, so that these block molds 1 to be paired gradually approach each other and start to overlap or superimpose one upon another. Next the block molds 1 are further displaced, so that the end faces P of the bottom portions 1a are made into engaegment and intimate contact with the inner surfaces of the side portions 1b, whereby the mold cavity 3 rectangular in cross section is defined by the four portions 1a, 1b, 1a and 1b.

When two block molds 1 to be paired are misaligned in the directions indicated by the double point arrow c as shown in FIG. 3, corners A of the bottom portions 1a will collide with corners B of the side portions 1b, resulting in problems that smooth contact is not ensured and wear of the block molds is accelerated by the collision. To overcome such problems, the paired block molds may be combined such that a gap is provided between the end surface P of the bottom portion 1a and the inner surface of the side portion 1b; then, there arises a further problem that molten metal poured into the mold cavity 3 will leak through this gap to the exterior.

The present invention was made to overcome the above and other problems encountered in the conventional endless track type continuous casting installations. According to the present invention, a guide rail for guiding the block molds of at least one endless track is provided so that after the block molds of the upper and lower endless tracks to be paired approach and are at least partly engaged with each other while being kept apart from each other in directions in which the bottom portions of the block molds are extended; that is, in widthwise directions of the casting, the block molds of the respective endless tracks to be paired are caused to gradually approach and intimately contact with each other in the widthwise directions of the casting.

The above and other objects, effects, features and advantages of the present invention will become more apparent from the following description of a preferred embodiment thereof taken in conjunction with the accompanying drawings.

BRIEF DESCRIPTION OF THE DRAWINGS

FIGS. 8(i), 8(ii) and 8(iii) sequentially illustrate the displacement of the upper and lower block mold pair and are cross sectional views taken along the line V—V of FIG. 4 as in the case of FIG. 5.

DETAILED DESCRIPTION OF A PREFERRED EMBODIMENT

Figure 1:
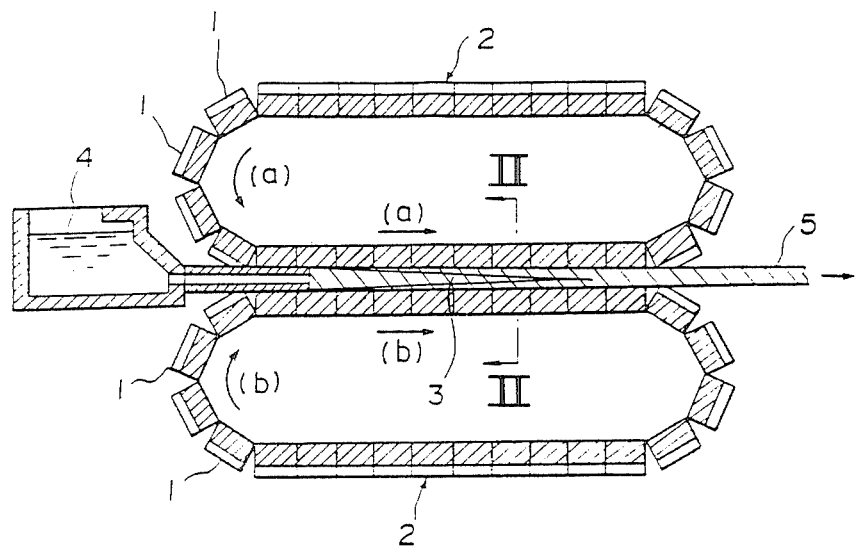
FIG. 1 is a side view illustrating the whole construction of a conventional endless track type continuous casting installation.
Figure 2:
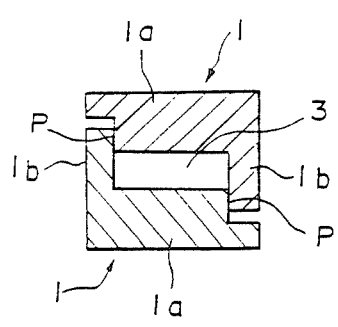
FIG. 2 is a sectional view taken along the line II—II of FIG. 1.
Figure 3:
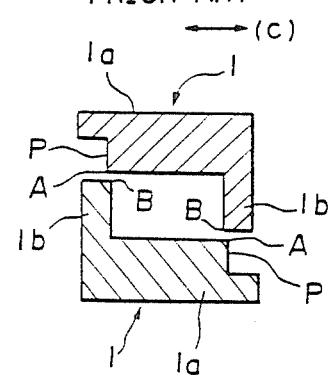
FIG. 3 is a view similar to FIG. 2 and is used to explain a problem encountered in the conventional endless track type continuous casting installation.
Figure 4:
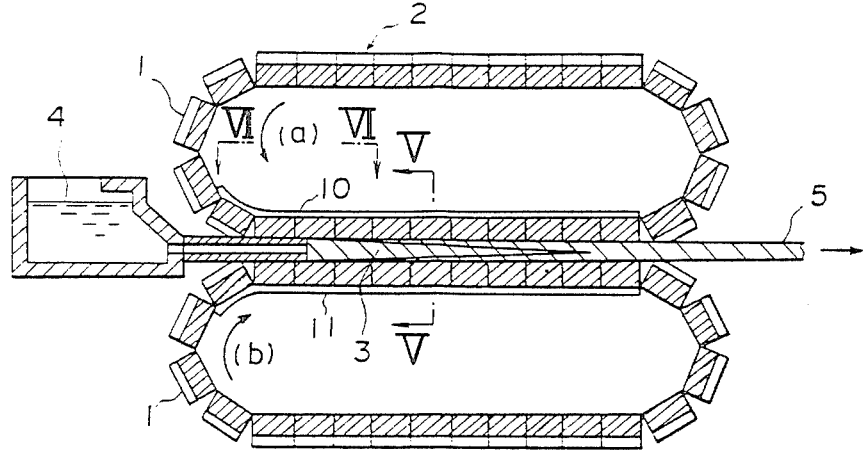
FIG. 4 is a side view schematically illustrating the whole construction of a preferred embodiment of a continuous casting installation in accordance with the present invention.

FIG. 4 shows the whole construction of a continuous casting installation in accordance with the present invention which is substantially similar in construction to the conventional continuous casting installation of the type shown in FIGS. 1 and 2 except the parts to be described below so that any parts which have been already described with reference to FIGS. 1 and 2 are designated by the same reference numerals and shall not be further described in this specification.

Figure 5:
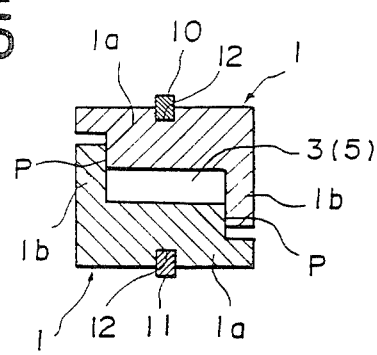
FIG. 5 is a sectional view taken along the line V—V of FIG. 4.

The continuous casting installation is different from the conventional continuous casting installation of the type described with reference to FIGS. 1 and 2 in that guide rails 10 and 11 are disposed in a region including a point where the block molds of the upper and lower endless tracks 2 to be paired approach each other and define the mold cavity 3. As shown in FIG. 5, the rear surfaces of the block molds 1 (that is, the inner surfaces of the upper and lower endless tracks 2) are formed with grooves 12 into which are fitted the guide rails 10 and 11, respectively, so that the block molds 1 are moved along the guide rails 10 and 11, respectively.

Figure 6:
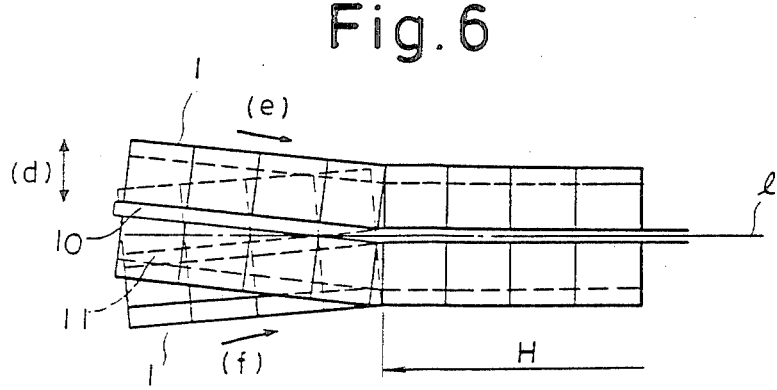
FIG. 6 is a view looking in the direction indicated by the arrows VI of FIG. 4 so as to illustrate the relative positions of the upper and lower guide rails 10 and 11.
Figure 7:
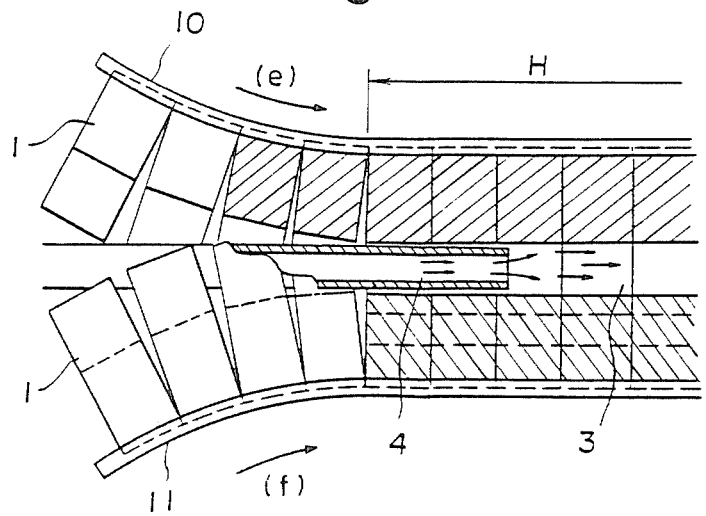
FIG. 7 is a side view thereof.

The guide rails 10 and 11 serve to gradually guide the block molds 1 of the upper and lower endless tracks 2 to be paired in directions in which the bottom portions 1a of the block molds 1 are extended, i.e., in the widthwise directions of the casting 5, in response to the displacement thereof. The guide rails 10 and 11 are constructed and disposed as shown in FIGS. 6 and 7. That is, in the step in which the block molds of the upper and lower endless tracks 2 approach each other, both of the upper and lower guide rails 10 and 11 are displaced in the widthwise directions of the casting 5, i.e., in the directions indicated by the double point arrow d in FIG. 6. When the block mold pair is displaced to the region in which the block molds start to engage with each other, both the guide rails 10 and 11 are directed toward the center line l. In the zone H in which the block molds pairs 1 define the mold cavity 3, the guide rails 10 and 11 are disposed in vertically opposed relationship with each other. The guide rails 10 and 11 are mounted on the main body of the continuous casting installation such that they are maintained stationary or their positions are adjustable. In FIGS. 6 and 7, the directions of the displacement of the upper and lower block molds 1 are indicated by the arrows e and f, respectively.

Figure 8:
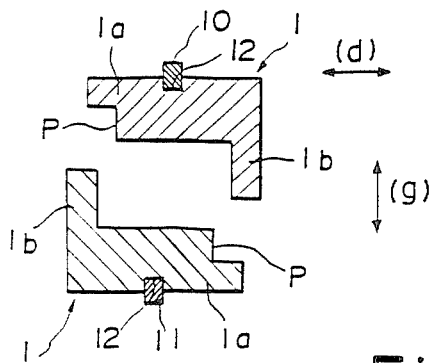
Figure 8:
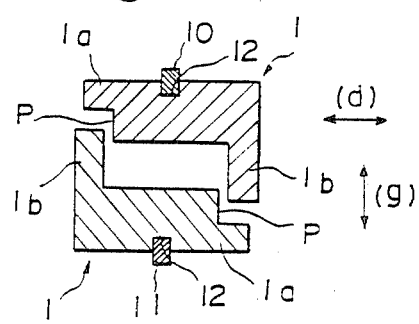
Figure 8:
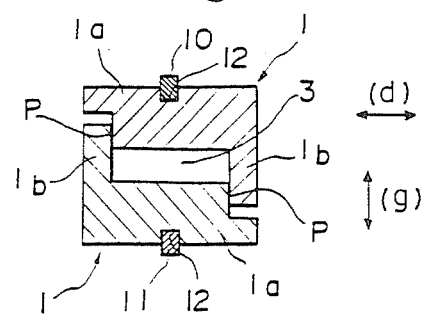

With the endless track type continuous casting installation having the guide rails 10 and 11 as described above, the block molds 1 are displaced as shown in FIGS. 8(i), 8(ii) and 8(iii) to define the mold cavity 3.

First, as shown in FIG. 8(i), the upper and lower block molds 1 vertically approach each other in the directions indicated by the double pointed arrow g as the endless tracks 2 revolve. In this case, both of the upper and lower block molds 1 are deviated from the center line l and are spaced apart from each other in the directions indicated by the double pointed arrow d.

In response to the further displacement of the block molds 1, the positions of the guide rails 10 and 11 are moved toward each other in the directions d so that the upper and lower block molds 1 guided by the guide rails 10 and 11, respectively, are caused to approach each other also in the directions d. That is, both the upper and lower block molds 1 approach each other in both the directions d and g. In this case, the end faces P of the bottom portions 1a of the block molds 1 are interiorly of the side portions 1b of the mated block molds 1; this state is referred to as "partly engaged" in this specification. In other words, in order that the upper and lower block molds 1 are brought to the positions as indicated, curvature of the guide rails 10 and 11 must be timed with the revolving positions of the endless tracks 2.

Thereafter, the block molds 1 are further displaced to approach each other in the directions d so that the bottom portion 1a of one block mold 1 is made into contact with the inner surface of the side portion 1b of the mated block mold 1, whereby the mold cavity 3 is defined.

Thus, when the upper and lower block molds 1 are made into contact with each other, they are prevented from colliding against each other and a perfect mold cavity 3 which does not permit leakage of molten metal is smoothly defined.

Figure 9:
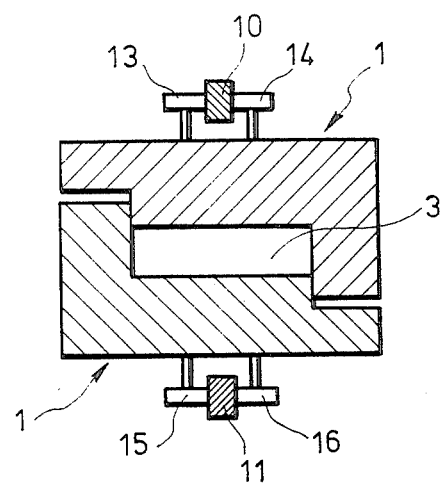
FIG. 9 shows a modification using another means for guidance.

Instead of forming the grooves 12 on the block molds 1 for guidance by the guide rails 10 and 11, guide rolls 13, 14, 15 and 16 may be mounted on the block molds 1 as shown in FIG. 9 so as to clamp the guide rails 10 and 11 for guidance by the rails.

So far both of the upper and lower endless tracks 2 have been described as being provided with guide rails 10 and 11, but it is of course possible to provide a guide rail only on the upper or lower endless track.

In this embodiment, the endless tracks 2 have been described as being disposed in vertically opposing relationship with each other, but it is to be understood that the present invention is not limited to such arrangement only.

As described above, according to the present invention, collision of the corners of the upper and lower block molds can be prevented so that the mold cavity can be smoothly defined and consequently the problem that wear of the block molds due to the collision against each other is accelerated can be overcome.

What is claimed is:

1. In an endless track type continuous casting installation wherein a plurality of block molds each of which is of L-shaped cross section and comprises a bottom portion and a side portion are connected with each other in the form of a loop such that the bottom portions extend along a peripheral surface of the loop while the side portions are disposed outwardly and perpendicular to the peripheral surface, thereby providing an endless track; a pair of endless tracks thus constructed are disposed in opposing relationship with each other such that a pair of the peripheral surface of one endless track is made into contact with a part of peripheral surface of the other endless track and each pair of upper and lower block molds are disposed in opposing and point-symmetric relationship with each other; at a zone of contact of said endless tracks, the block molds of said both endless tracks to be paired are combined such that an end face of the bottom portion of one block mold is made into engagement and intimate contact with an inner surface of the side portion of the other block mold, thereby defining a mold cavity; and while the block molds are displaced in same direction at said zone of contact, molten metal is poured into said mold cavity and is cast into a casting, an improvement comprising a guide rail for guiding the block molds of at least one endless track such that as the block molds of said both endless tracks to be paired are displaced, said block molds are caused to at least partly engage with each other while the end face of the bottom portion of one of the block molds to be paired is kept apart from the inner surface of the side portion of the other block mold in directions in which the bottom portions of the block molds are extended and then the block molds are caused to gradually approach each other in said directions of extension of said bottom portions and are made into intimate contact with each other.

2. The installation according to claim 1 wherein said guide rail extends over a whole of said zone of contact.

3. The installation according to claim 1 wherein said guide rail is disposed at an inside of said loop of said block molds, that is, at rear surfaces of the block molds.

4. The installation according to claim 1 wherein each block mold is formed with a groove for engagement with said guide rail.

5. The installation according to claim 1 wherein each block mold is provided with guide rolls for engagement with said guide rail.

* * * * *